(12) United States Patent
Heise

(10) Patent No.: US 8,851,710 B2
(45) Date of Patent: Oct. 7, 2014

(54) LIGHTING DEVICE

(76) Inventor: Sebastian Heise, Kastorf (DE)

( * ) Notice: Subject to any disclaimer, the term of this patent is extended or adjusted under 35 U.S.C. 154(b) by 1018 days.

(21) Appl. No.: 12/452,124

(22) PCT Filed: Jun. 13, 2008

(86) PCT No.: PCT/EP2008/004786
§ 371 (c)(1),
(2), (4) Date: Dec. 15, 2009

(87) PCT Pub. No.: WO2008/151826
PCT Pub. Date: Dec. 18, 2008

(65) Prior Publication Data
US 2010/0135023 A1 Jun. 3, 2010

(30) Foreign Application Priority Data
Jun. 15, 2007 (DE) .................. 20 2007 008 430 U

(51) Int. Cl.
*F21S 8/00* (2006.01)
*G02B 3/00* (2006.01)
*G02B 19/00* (2006.01)
*G02B 27/09* (2006.01)
*F21V 5/04* (2006.01)
*F21V 14/06* (2006.01)
*G02B 3/14* (2006.01)
*G02B 3/08* (2006.01)
*F21Y 101/02* (2006.01)
*F21W 131/406* (2006.01)

(52) U.S. Cl.
CPC ................ *F21V 14/06* (2013.01); *G02B 3/005* (2013.01); *G02B 19/0066* (2013.01); *G02B 27/0966* (2013.01); *F21V 5/04* (2013.01); *F21Y 2101/02* (2013.01); *G02B 19/0014* (2013.01); *G02B 3/14* (2013.01); *F21W 2131/406* (2013.01); *G02B 3/0062* (2013.01); *G02B 27/0961* (2013.01); *G02B 3/08* (2013.01)
USPC ....................... 362/281; 362/249.02; 362/268

(58) Field of Classification Search
CPC ......... F21V 17/00; F21V 14/08; F21V 14/06; F21V 5/043; F21V 5/007; F21W 2131/10; F21W 2131/107; F21W 2131/406
USPC ...................................... 362/281, 249.02, 268
See application file for complete search history.

(56) References Cited

U.S. PATENT DOCUMENTS 2,576,849 A * 11/1951 Moore ..................... 340/815.41
3,484,599 A 12/1969 Little
(Continued)

FOREIGN PATENT DOCUMENTS

DE 39 26 618 A1 2/1991
DE 195 19 417 A1 11/1996
(Continued)

*Primary Examiner* — Mary McManmon
(74) *Attorney, Agent, or Firm* — Alix, Yale & Ristas, LLP

(57) ABSTRACT

A lighting device having a light source and devices for changing the illumination area, comprising two arrangements made of transparent flat components with oblong imaging elements disposed next to each other in a parallel fashion, having a surface deviating from a plane on at least one side, the imaging properties of the component arrangements can be changeable and the longitudinal axes of the one component arrangement being perpendicular to those of the other, characterized in that the light source is a matrix-shaped arrangement of light emitting diodes.

23 Claims, 4 Drawing Sheets

(56) References Cited

U.S. PATENT DOCUMENTS

| | | |
|---|---|---|
| 3,600,063 A | 8/1971 | Bowen |
| 4,733,944 A * | 3/1988 | Fahlen et al. ............... 359/624 |
| 4,919,518 A * | 4/1990 | Ogino et al. ................ 359/457 |
| 4,965,488 A * | 10/1990 | Hihi ............................ 313/499 |
| 5,775,799 A * | 7/1998 | Forkner ...................... 362/268 |
| 6,282,027 B1 | 8/2001 | Hough |
| 6,456,436 B2 * | 9/2002 | Miura et al. ................ 359/619 |
| 6,632,004 B2 * | 10/2003 | Sugawara et al. ........... 362/281 |
| 7,706,072 B2 * | 4/2010 | Kita ............................ 359/624 |
| 8,023,193 B2 * | 9/2011 | Chen ........................... 359/624 |
| 2005/0265027 A1 * | 12/2005 | Wu et al. ..................... 362/293 |
| 2007/0171646 A1 * | 7/2007 | Kojima ........................ 362/268 |
| 2010/0039819 A1 * | 2/2010 | Fournier et al. ............. 362/268 |

FOREIGN PATENT DOCUMENTS

| | | |
|---|---|---|
| EP | 0 965 789 A | 12/1999 |
| EP | 1 583 158 A | 10/2005 |
| WO | WO2005/093319 A | 10/2005 |
| WO | WO2006/072885 A | 7/2006 |

* cited by examiner

LIGHTING DEVICE

BACKGROUND

The invention relates to a lighting device comprising a light source and units for changing the illumination region, which have two arrangements of transparent plate-type components having parallel elongate imaging elements which are arranged alongside one another and which have a surface deviating from a plane at least on one side, wherein the imaging properties of the component arrangements are changeable and the longitudinal axes of one component arrangement are oriented perpendicular to those of the other component arrangements. In particular, the invention relates to a lighting unit for illuminating buildings, places of interest, objects in exhibitions, for stage lighting and the like.

Lighting devices are used not just to illuminate spaces and to bathe them in more or less diffuse light. The lighting devices are often also used to deliberately direct light onto certain objects or in specific directions. In that case, however, often there is a desire to illuminate only a certain region, for example—in the illumination of buildings—only a particular building and not neighboring buildings. In order to prevent the undesirable lateral emergence of light into regions that are not intended to be illuminated, it is known to provide corresponding screens in front of the lighting unit. Said screens screen off the light, but overall mean a loss of light. The light source therefore has to emit more light than if the entire quantity of light could be concentrated onto the desired region.

The use of screens is therefore firstly a source of unnecessarily high power consumption. Another problem regarding the high power consumption and hence undesirable generation of heat is the fact that for the known lighting devices use is normally made of incandescent lamps, fluorescent lamps, mercury vapor lamps and the like, in which a large part of the power supplied is converted into heat.

In one lighting device of the type mentioned in the introduction (U.S. Pat. No. 3,600,063) a laser is used as the light source. The laser light is expanded in a beam expander in order to enable large-area illumination. Owing to the low efficiency of lasers this is, of course, even less economical than the use of the above-mentioned incandescent lamps, fluorescent lamps or mercury vapor lamps.

The invention addresses the problem of providing a lighting device of the type mentioned in the introduction which can be used to illuminate objects in a targeted manner and with a low power consumption.

SUMMARY

The light source is a matrix-type arrangement of light emitting diodes (LEDs).

A high power consumption is thus avoided by virtue of the fact that for the illumination use is made not of incandescent lamps, fluorescent lamps and the like, but rather of light emitting diodes, which convert a particularly large proportion of the power supplied into light. Such light emitting diodes have been used for many years as indication means for switch panels, computers and many machines. Here, however, they serve for the novel use as a light source for lighting arrangements.

By virtue of the two component arrangements having parallel elongate imaging elements arranged alongside one another, the imaging properties of which are changeable, the illuminated region can be set in two mutually perpendicular directions. What can be achieved as a result is that the entire light available is directed onto the desired object. Any losses owing to shading with screens do not occur.

In one advantageous embodiment, the imaging properties of the component arrangements can be changed by virtue of the fact that the component arrangements have two elements having parallel elongate imaging elements arranged alongside one another, the spacing of which is changeable. In this case, the imaging elements can be displaced parallel to one another or else arranged at different angles with respect to one another. As a result, the imaging properties and also the illuminated region change in the direction of a plane that is perpendicular to the cylinder axes. The feature that the lighting device has two component arrangements each having two plate-type components does not mean that these component arrangements are totally separate from one another. By way of example, the two plate-type components of the two component arrangements which are arranged alongside one another could also be assembled together. This would still provide two component arrangements whose imaging properties can be changed independently of one another.

In this case, both elements of one or both component arrangements can have convex imaging elements, that is to say areas projecting convexly from a common plate or the like.

On the other hand, another advantageous embodiment is distinguished by the fact that one imaging element of one or both component arrangements has convex imaging elements and the other imaging element has concave imaging elements.

In another embodiment it is provided that one or both component arrangements have a plate-type closed cavity delimited at one or both opposite surfaces by parallel rigid webs and elastic film-type material arranged between the latter, and in that provision is made of a unit for applying an excess or reduced pressure to the cavity by means of a liquid. Depending on excess or reduced pressure, the elastic film-type materials between the webs curve outward or inward and thus produce convex or concave substantially partial-cylinder-shaped imaging elements. Depending on the magnitude of the excess or reduced pressure, the focal length can also be changed in this case. The same setting possibilities as in the case of rigid component arrangements which can be displaced relative to one another are therefore achieved. The advantage, however, is the particularly easy producibility and also the fact that only one plate-type component is required for each component arrangement in order to set the illumination region.

In another advantageous embodiment, the imaging elements have the cross section of a Fresnel lens, wherein the ring structures of the known Fresnel lenses are replaced by linear structures extending along the longitudinal axes of the imaging elements. As is known, a smaller structural height is thereby made possible.

In the lighting device according to the invention it is possible that the illumination angle in the planes perpendicular to the longitudinal axes can be set to values of between 10° and 160°, preferably between 10° and 120°, and in particular to 20° to 90°.

The form of the matrix-type arrangement of light emitting diodes will expediently be adapted to the intended form of the illuminated region, although this form can be changed, of course, by the component arrangements according to the invention. In one advantageous embodiment, the matrix-type arrangement of light emitting diodes is square. One particularly advantageous embodiment for obtaining strong illumination effects is in this case distinguished by the fact that the matrix-type arrangement of light emitting diodes has a size of approximately 400×400 mm. In another advantageous embodiment, the matrix-type arrangement of light emitting diodes is rectangular, and it has, in particular, a size of approximately 400×600 mm. In this case, the light emitting diodes are expediently arranged in honeycomb-like fashion, whereby a maximum number of light emitting diodes can be accommodated in a predetermined area. In another advantageous embodiment, the diodes are arranged in a square structure.

As already mentioned, very high light powers can be produced with the arrangement of light emitting diodes. The total electrical power of the light emitting diodes can be between 100 W and 10 kW. In one advantageous embodiment, which on the one hand shines very brightly, but on the other hand can still be handled well, the total electrical power of the light emitting diodes is approximately 2000 W.

In order to avoid errors of spherical aberration, it is the case that, if those surfaces of the elongate imaging elements which deviate from a plane are partial-cylinder-shaped, the cylindrical areas of the imaging elements are expediently smaller than semicylinders. Said areas advantageously take up ¼ to 1/72 of the area of a corresponding cylinder. Areas which are particularly advantageous here are those which relate to 1/10 to 1/36, but very particularly 1/10 to 1/18, of a corresponding cylinder surface. In this case, the numerical data relate to the portion of the angle of 360° over which the cylinder-shaped part extends.

The matrix-like arrangement of light emitting diodes, particularly if a relatively large number are involved, emits light essentially consisting of parallel light beams. However, this behavior can be improved according to the invention by the light emitting diodes being provided with collimator lenses. In particular, these collimator lenses can be embodied such that the illumination angle of a light emitting diode is 10° or less.

BRIEF DESCRIPTION OF THE DRAWINGS

The invention is described below on the basis of advantageous embodiments with reference to the accompanying drawings, in which.

DETAILED DESCRIPTION

Figure 1:
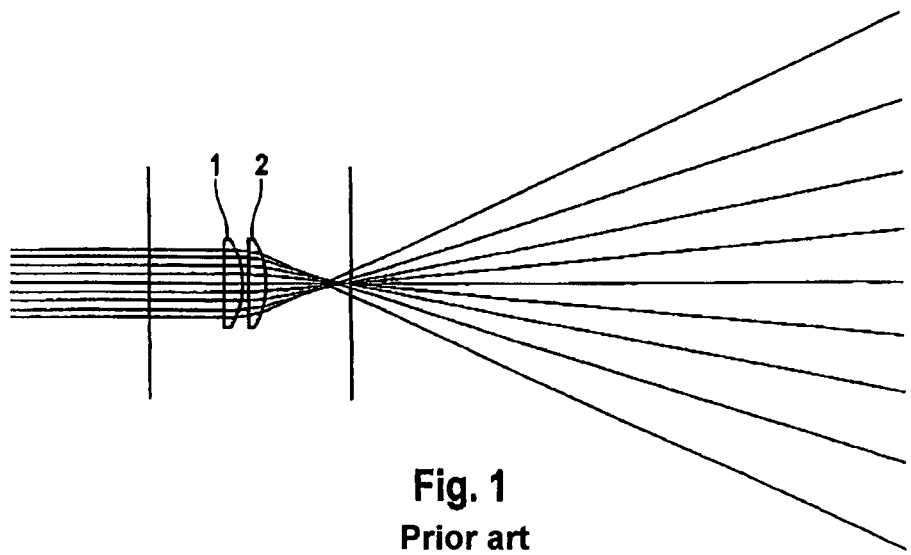
FIGS. 1-4 show schematic illustrations of the imaging behavior of lens pairs.
Figure 2:
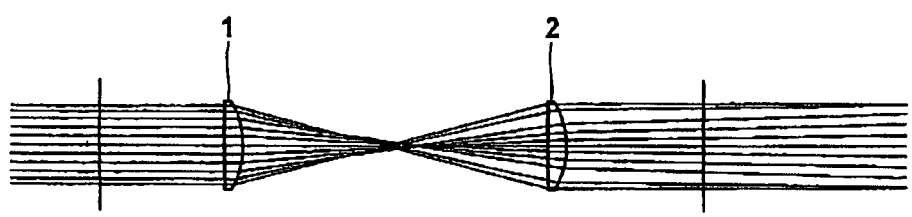
Figure 3:
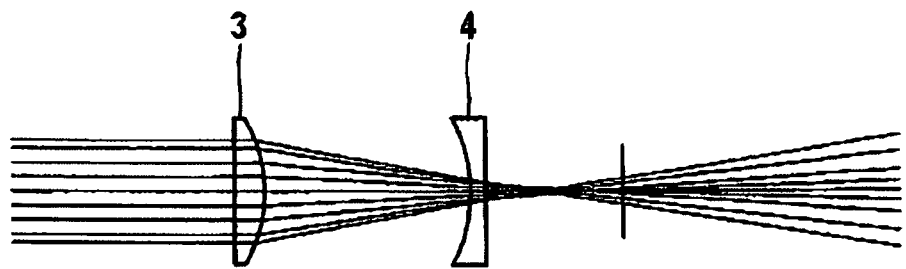
Figure 4:
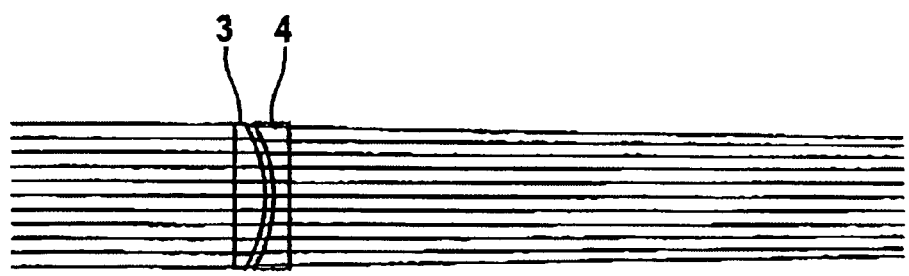

FIGS. 1 to 4 illustrate how light rays coming from the left can be directed onto smaller or larger angle ranges by two convex lenses 1, 2 (FIGS. 1 and 2) or one convex lens 3 and one concave lens 4 (FIGS. 3 and 4). In the figures this is done by changing the distances between the lenses 1, 2 and 3, 4.

Figure 5:
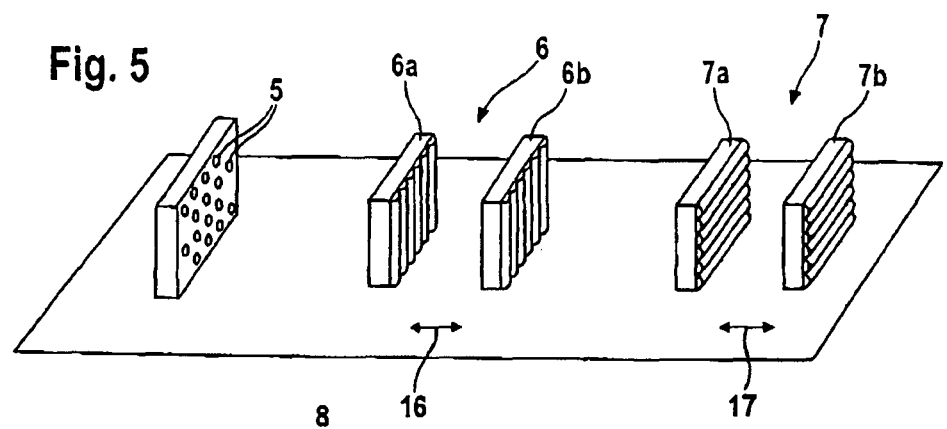
FIG. 5 shows, in a schematic perspective illustration, the basic construction of one embodiment of the lighting device.

In the embodiment according to the invention, use is now made not of conventional rotationally symmetrical lenses, but rather of elongate imaging elements, a plurality of which are arranged parallel to one another. FIG. 5 shows the basic construction of one embodiment according to the invention. This embodiment has a matrix-type arrangement of light emitting diodes 5. The light emitted by the latter impinges on two arrangements 6, 7 having two components 6a, 6b and 7a, 7b, respectively, which, at one surface thereof, are provided with parallel partial cylinders adjoining one another. It goes without saying that the components are transparent in this case. By changing the distances between the two components 6a, 6b and 7a, 7b in the direction of the double-headed arrows 16, 17, it is possible in this case to change the illumination angle of the light beam in accordance with FIGS. 1 to 4 in two mutually perpendicular directions. This is also possible if the components 6b and 7a are assembled together integrally. This results in a rectangular illumination field whose width and height are changeable. In particular, it can be changed in a range of 10° to 160°, in particular 10° to 120°, preferably 20° to 90°. Trapezoidal illumination fields can also be produced by inclining the components 6a, 6b and 7a, 7b.

Figure 6:
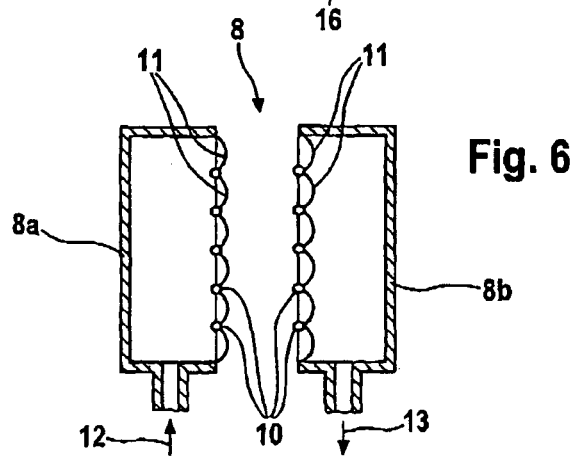
FIG. 6 shows another embodiment of a component arrangement in cross section.

FIG. 6 shows another embodiment of component arrangements 8. In this case, the elements 8a and 8b are parallelepipedal hollow bodies having a series of parallel webs 10 on one side. Elastic films 11 are arranged between said, webs. In this case, the left-hand part of FIG. 6 indicates by means of an arrow 12 that an excess pressure is applied by means of a liquid in the cavity, as a result of which the films 11 curve convexly outward and convex imaging elements arise on account of the refractive index of the liquid. The right-hand part of FIG. 6 indicates a reduced pressure by means of the arrow 13, such that concave imaging elements arise in interaction with the liquid present in the element 8b. By means of the interaction of the convex and concave imaging elements, or by virtue of both imaging elements being convex imaging elements, the illumination angle can be changed in one direction again in a manner analogous to that in the case of the embodiment in FIG. 5. It is then possible to change the illumination angle in the direction perpendicular thereto by means of a corresponding unit filled with liquid or else by means of two rigid elements, the spacing of which can be changed in accordance with the embodiment from FIG. 5. Although two components 8a, 8b are shown in FIG. 6, one component 8a having convex imaging elements will normally suffice since, after all, the focal length of said imaging elements is variable, and so the illumination field can be varied even without a second component.

Figure 7:
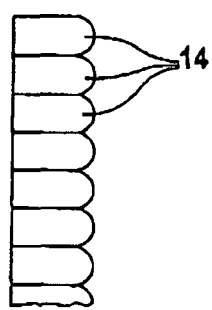
FIG. 7 shows a detailed illustration in cross section of one embodiment of the component from FIG. 5.
Figure 8:
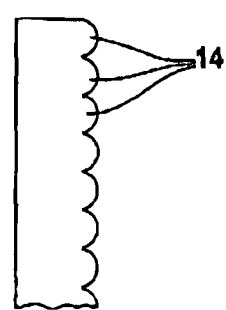
FIG. 8 shows a detailed illustration in cross section of another embodiment of the component from FIG. 5.

FIGS. 7 and 8 show in cross section, on an enlarged scale, component arrangements which can be used in the embodiment from FIG. 5. The embodiment in FIG. 7 has individual slat-type elements 14 which are arranged side by side, have a cylindrical curvature on their surface on the right in the figure and thus form the imaging elements 14. The cylindrical imaging elements 14 could also be arranged at distances, in which case the interspaces would have to be provided with non-transparent screens, although this would mean a loss of light. In the embodiment in FIG. 8, a plate is provided with strip-type elevations that form the imaging elements 14.

Figure 9:
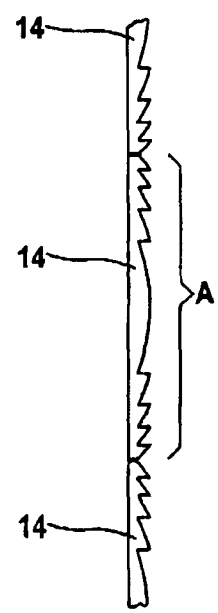
FIG. 9 shows a detailed illustration in cross section of another embodiment of a component.

FIG. 9 shows another type of imaging elements, which correspond in cross section to a Fresnel lens. In this case, the circular structures of a conventional Fresnel lens are extended in length and are lengthy constructions which extend over the length of the components. In this case, the structure of a Fresnel lens has the known advantage that the total curvature is divided into individual curvature regions, with the result that the total thickness of the imaging elements is smaller than in conventional imaging elements. In this case, the region of an imaging element 14 is designated by A.

Figure 10:
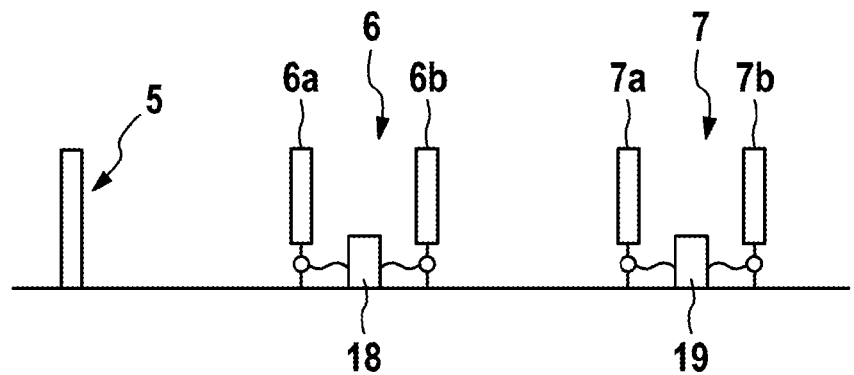
FIG 10 shows in a schematic side illustration, the basic construction of another embodiment of the lighting device.

FIG. 10 shows the lighting device wherein it has an adjusting unit 18 by means if which the spacing between the plate-type components 6a and 6b is changeable. The lighting device also includes adjusting unit 19 for changing the angle between components 7a and 7b.

Figure 11:
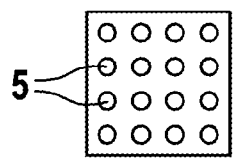
FIG. 11 shows a fragmentary front view of a component of the embodiment of FIG. 10.
Figure 12:
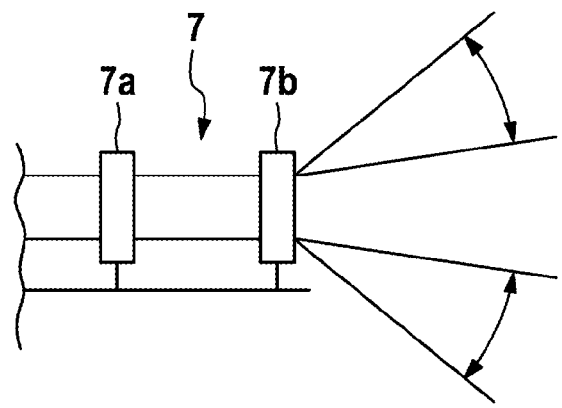
FIG. 12 is a side schematic view of the adjusting of the lighting device of FIG. 10 showing that the illumination angle is a variable.

A square matrix-type arrangement of the light emitting diodes 5 is illustrated in FIG. 11. FIG. 12 shows that the illumination angle is changeable.

The invention claimed is:

1. A lighting device comprising a light source and units for changing the illumination region, which have first and second arrangements of transparent plate-type components having parallel elongate imaging elements which are arranged alongside one another and which have a surface deviating from a plane at least on one side, the parallel elongate imaging elements of the plate-type components of the first arrangement oriented in a first direction and the parallel elongate imaging elements of the plate-type components of the second arrangement oriented in a second direction perpendicular to said first direction, said first arrangement disposed adjacent said second arrangement, wherein the imaging properties of the component arrangements are changeable and the longitudinal axes of one component arrangement are oriented perpendicular to those of the other component arrangements, characterized in that the light source is a matrix-type arrangement of light emitting diodes, and in that each of the component arrangements has two plate-type components having parallel elongate imaging elements arranged alongside one another, and that the spacing between two plate-type components is changeable and the angle between two plate-type components is changeable for changing from one illumination region to another illumination region, wherein the spacing between the two plate-type components is changeable during normal operation of the lighting device.

2. The lighting device as claimed in claim 1, characterized in that it has adjusting units by means of which the plate-type components are displaceable parallel to one another.

3. The lighting device as claimed in claim 1, characterized in that it has adjusting units by means of which the plate-type components can be adjusted and can be arranged at an angle with respect to one another.

4. The lighting device as claimed in claim 1, characterized in that both plate-type components of one or both component arrangements have convex imaging elements.

5. The lighting device as claimed in claim 1, characterized in that one plate-type component of one or both component arrangements has convex imaging elements and the respective other plate-type component has concave imaging elements.

6. The lighting device as claimed in claim 1, characterized in that the illumination angle in the planes perpendicular to the longitudinal axes are set to values of between 10° and 160°.

7. The lighting device as claimed in claim 6, characterized in that the illumination angle in the planes perpendicular to the longitudinal axes are set to values of between 10° and 120°.

8. The lighting device as claimed in claim 6, characterized in that the illumination angle in the planes perpendicular to the longitudinal axes are set to values of between 20° and 90°.

9. The lighting device as claimed in claim 1, characterized in that the matrix-type arrangement of light emitting diodes is square.

10. The lighting device as claimed in claim 9, characterized in that the matrix-type arrangement of light emitting diodes has a size of approximately 400×400 mm.

11. The lighting device as claimed in claim 1, characterized in that the matrix-type arrangement of light emitting diodes is rectangular.

12. The lighting device as claimed in claim 11, characterized in that the matrix-type arrangement of light emitting diodes has a size of approximately 600×400 mm.

13. The lighting device as claimed in claim 1, characterized in that the light emitting diodes are arranged in honeycomb-like fashion.

14. The lighting device as claimed in claim 1, characterized in that the light emitting diodes are arranged in a square structure.

15. The lighting device as claimed in claim 1, characterized in that the total power of the light emitting diodes is between 100 W and 10 kW.

16. The lighting device as claimed in claim 1, characterized in that the total power of the light emitting diodes is approximately 2000 W.

17. The lighting device as claimed in claim 1, characterized in that those surfaces of the elongate imaging elements which deviate from a plane are partial-cylinder-shaped and define cylindrical areas and the cylindrical areas are smaller than half of a corresponding cylinder area.

18. The lighting device as claimed in claim 17, characterized in that the cylindrical areas of the elongate imaging elements are smaller than 1/4 to 1/72 of a corresponding cylinder area.

19. The lighting device as claimed in claim 17, characterized in that the cylindrical areas of the elongate imaging elements are smaller than 1/10 to 1/36 of a corresponding cylinder area.

20. The lighting device as claimed in claim 17, characterized in that the cylindrical areas of the elongate imaging elements are smaller than 1/10 to 1/18 of a corresponding cylinder area.

21. The lighting device as claimed in claim 1, characterized in that those surfaces of the elongate imaging elements which deviate from a plane define a cross section of a Fresnel lens.

22. The lighting device as claimed in claim 1, characterized in that the light emitting diodes are provided with collimator lenses.

23. The lighting device as claimed in claim 22, characterized in that the collimator lenses limit the light cone emitted by the light emitting diodes to an aperture angle of 10°.

* * * * *